May 24, 1955 G. C. GENTRY ET AL 2,708,818
ROTARY GRASS CUTTER

Filed Nov. 17, 1953 3 Sheets-Sheet 1

George C. Gentry
George A. Gentry
INVENTORS.

BY *Clarence A. O'Brien*
*and Harvey B. Jacobson*
Attorneys

May 24, 1955 G. C. GENTRY ET AL 2,708,818
ROTARY GRASS CUTTER
Filed Nov. 17, 1953 3 Sheets-Sheet 2
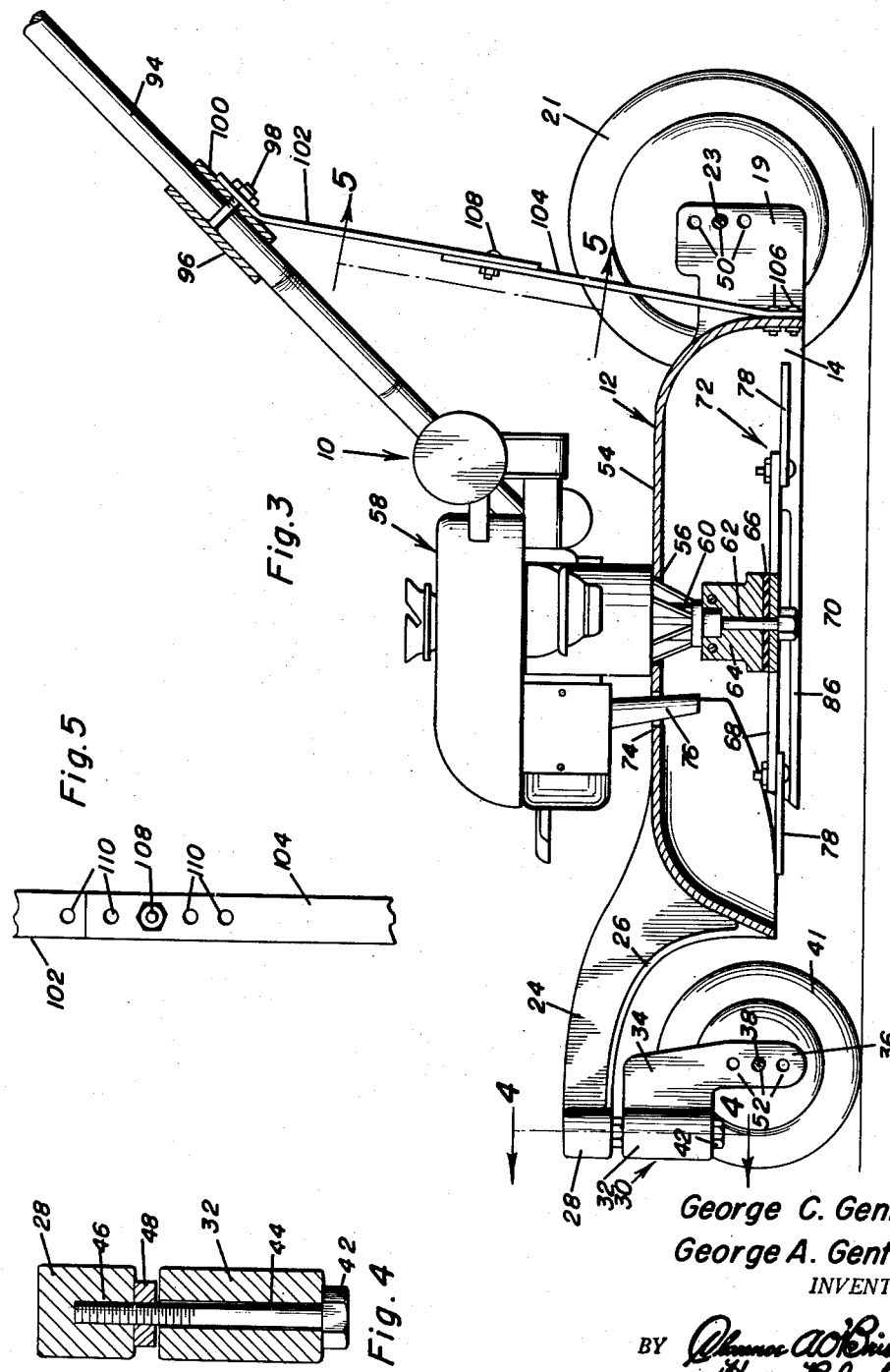
George C. Gentry
George A. Gentry
INVENTORS May 24, 1955

G. C. GENTRY ET AL 2,708,818

ROTARY GRASS CUTTER

Filed Nov. 17, 1953

George C. Gentry
George A. Gentry
INVENTORS.

BY *Thomas A. O'Brien*
*and Harvey B. Jacobson*
Attorneys

United States Patent Office 2,708,818
Patented May 24, 1955

2,708,818

ROTARY GRASS CUTTER

George C. Gentry and George A. Gentry, Rockledge, Fla., assignors to George A. Gentry and Son, Rockledge, Fla., a copartnership Application November 17, 1953, Serial No. 392,556

2 Claims. (Cl. 56—25.4)

This invention relates in general to improvements in grass cutters, and more specifically to an improved rotary grass cutter.

The primary object of this invention is to provide an improved rotary grass cutter which includes a rotary blade assembly carried by supporting wheels, the supporting wheels being vertically adjustable whereby the effective cutting height of the rotary blade of the rotary blade assembly may be selectively varied.

Another object of this invention is to provide an improved rotary grass cutter of the type which utilizes a rotary grass cutting blade, the grass cutting blade being attached to a drive shaft through the use of a slip clutch so as to permit slipping of the rotary blade with respect to the drive shaft upon the striking of an obstacle by the rotary blade.

Another object of this invention is to provide an improved rotary grass cutter which is so constructed and arranged whereby the grass cutter has an effective cutting width substantially equal to the width of the grass cutter, whereby said grass cutter may be utilized in cutting grass closely adjacent buildings, plants, etc.

A still further object of this invention is to provide an improved rotary grass cutter of the type utilizing an internal combustion engine as the power unit, the internal combustion engine being so mounted whereby the exhaust pipe thereof passes through a supporting frame of the rotary grass cutter and exhaust gases are exited within the confines of the supporting frame and directed downwardly into the cut grass.

Yet another object of this invention is to provide an improved rotary grass cutter of the type which utilizes a rotary blade, the rotary blade being provided with removable cutting elements which are reversible, whereby the opposed cutting edges of the cutting elements may be utilized.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged longitudinal vertical sectional view taken substantially upon the plane indicated by the section line 3—3 of Figure 2 and shows the general arrangement of the power unit of the rotary grass cutter and the manner in which the rotary blade is attached to a drive shaft thereof;

Figure 4 is an enlarged fragmentary vertical sectional view taken substantially upon the plane indicated by the section line 4—4 of Figure 3 and shows the manner in which the forward caster wheel assembly is pivotally attached to a forward extending support element of the supporting frame;

Figure 5 is an enlarged fragmentary vertical sectional view taken substantially upon the plane indicated by the section line 5—5 of Figure 3 and shows the manner in which halves of a base for the handle are adjustably connected together in overlapping relation;

Figure 1:
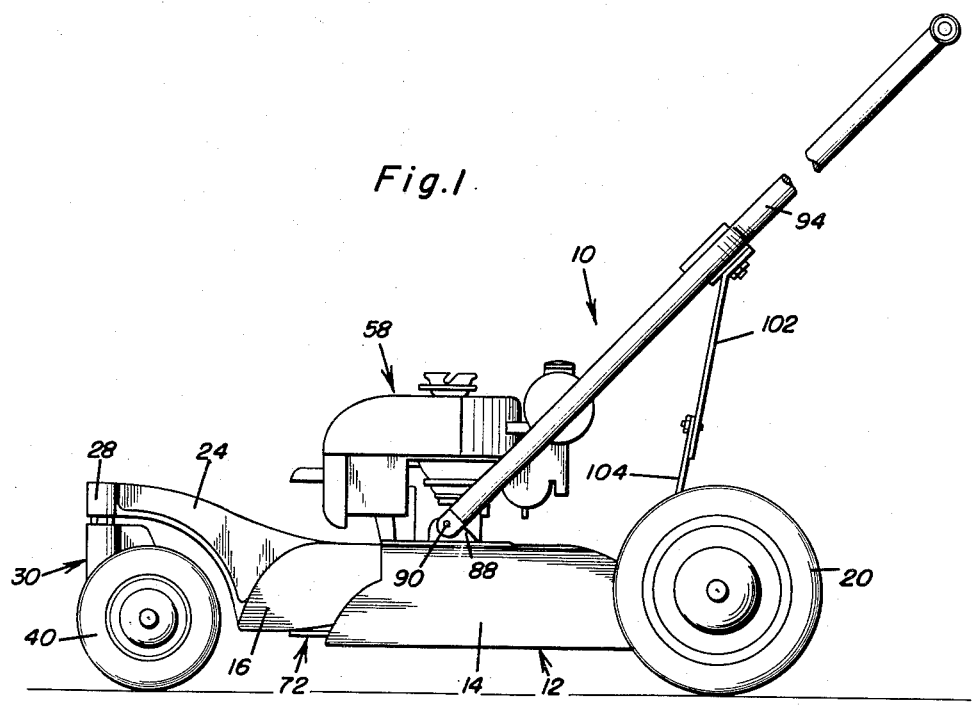
Figure 1 is a fragmentary side elevational view of the rotary grass cutter which is the subject of this invention and shows the general outline of the same.

Referring now to the drawings in detail, it will be seen that the rotary grass cutter which is the subject of this invention is referred to in general by the reference numeral 10. The rotary grass cutter 10 includes a supporting frame which is referred to in general by the reference numeral 12. The supporting frame 12 includes a relatively large downwardly open concave body portion 14 which includes a semi-circular forward part 16 which is of a reduced width.

Figure 2:
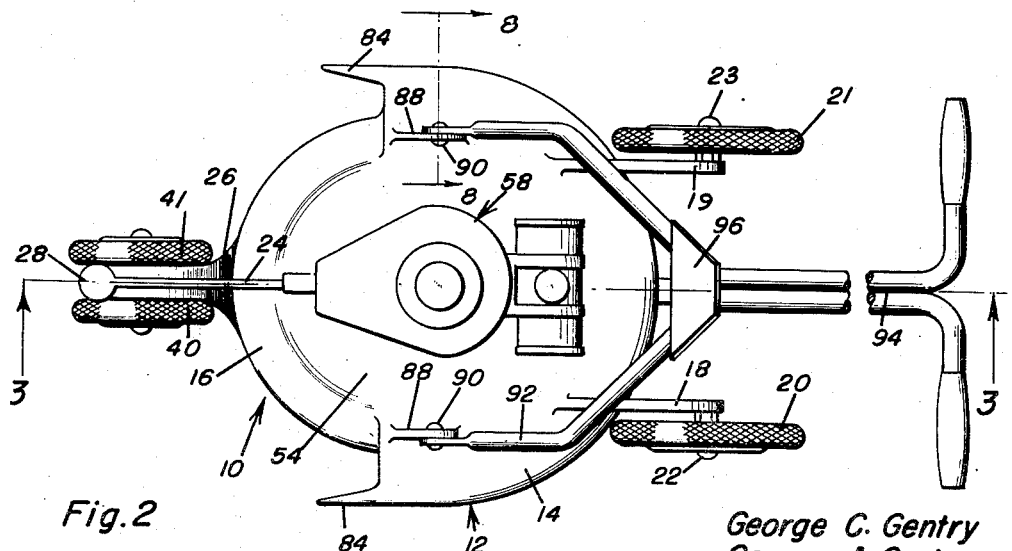
Figure 2 is a fragmentary top plan view of the rotary grass cutter of Figure 1 and shows the general arrangement of the supporting wheels thereof.

As is best illustrated in Figure 2, the body portion 14 of the supporting frame 12 has formed integrally therewith rearwardly extending frame elements 18 and 19. The frame elements 18 and 19 are disposed in vertical planes and are in spaced parallel relation. Removably secured to the rear portions of the frame elements 18 and 19 are rear wheels 20 and 21, the rear wheels 20 and 21 being secured to the frame elements 18 and 19 by axles 22 and 23 which form supports for the rear wheels 20 and 21.

Carried by the forward part 16 and projecting forwardly from the center thereof is a forwardly projecting frame element 24. The frame element 24 extends upwardly and forwardly, as is best illustrated in Figure 3, and the lower edge thereof is provided with a generally horizontal reinforcing flange 26. The extreme forward end of the frame element 24 is provided with a circular cross-sectional enlargement 28. Pivotally connected to the enlargement 28 is a front caster assembly which is referred to in general by the reference numeral 30.

As is best illustrated in Figure 3, the front caster assembly includes a forward vertically extending tubular portion 32 which has secured to the rear edge thereof an inverted L-shaped support element 34 which is rearwardly offset from the tubular portion 32. The support element 34 includes a depending leg portion 36 which has extending therethrough a transverse axle 38. Rotatably carried by the axle 38 on opposite sides of the support element 34 are spaced front wheels 40 and 41.

Referring now to Figure 4 in particular, it will be seen that the caster assembly 30 is retained in place by a vertically extending fastener 42 which extends through a vertical bore 44 in the tubular portion 32. The fastener 44 is threadedly engaged in an internally threaded bore 46 which opens downwardly through the bottom of the projection 28. The fastener 42 is adjustably positioned with respect to the projection 28 by a lock nut 48 threadedly engaged thereon and jammed against the underside of the projection 28. It will be understood that the tubular portion 32 is free to pivot about the vertical axis of the fastener 42.

Referring once again to Figure 3 in particular, it will be seen that the frame elements 18 are provided with vertically spaced apertures 50. The apertures 50 selectively receive the axles 22 whereby the effective height of the frame elements 18 with respect to the ground may be selectively varied. It will be also noted that the depending leg portion 36 of the support element 34 is provided with similar vertically spaced apertures 52. The vertically spaced apertures 52 have adjustably removably seated therein the axle 38 so that the effective height of the projection 28 may be similarly varied with respect to the ground. Thus, it will be seen that by varying the positions of the axles 22 and 38, the effective height of the supporting frame 12 from the ground may be selectively varied.

The body portion 14 of the supporting frame 12 is provided with a generally flat top wall part 54. The top wall part 54 is provided with an opening 56 through which passes a portion of an internal combustion engine which is referred to in general by the reference numeral 58. The internal combustion engine 58 is of a conventional type and requires little explanation of its structure with the exception of those parts which are directly involved with the construction of the rotary grass cutter 10.

It will be noted that the internal combustion engine 58, which forms the power unit for the rotary grass cutter 10, includes a housing portion 60 which projects downwardly into the interior of the supporting frame 12. The housing portion 60 has projecting downwardly therefrom a vertical drive shaft 62 which is mounted for rotation. Carried by the upper part of the drive shaft 62 is a clutch block 64. Carried by the drive shaft 62 immediately below the clutch block 64 is a clutch disk 66, the clutch disk 66 overlying a blade member 68 also carried by the drive shaft 62. The lower end of the drive shaft 62 is provided with an adjustable nut 70 which is utilized to adjustably clamp the clutch disk 66 between the blade member 68 and the clutch block 64. Thus, it will be seen that when the rotary blade 72 of which the blade member 68 is a part strikes a relatively immovable object, it will slip with respect to the drive shaft 62 due to the provision of the clutch disk 66 so as to minimize the damage which may occur.

It will be noted that the top wall part 54 of the supporting frame 12 is provided with an opening 74 which is disposed forwardly of the opening 56. Passing downwardly through the opening 74 is an exhaust pipe 76 of the internal combustion engine 58. It will be noted that the exhaust pipe 76 terminates within the confines of the supporting frame 12 above the rotary blade 72. Thus, it will be seen that the exhaust gases from the internal combustion engine 58 will be distributed among the freshly cut grass so as to greatly reduce the presence of exhaust gases and thereby reduce the unpleasantness of such exhaust gases. Also, by passing the exhaust pipe 76 downwardly into the confines of the supporting frame 12, the supporting frame 12 functions as an effective muffler.

Figure 6:
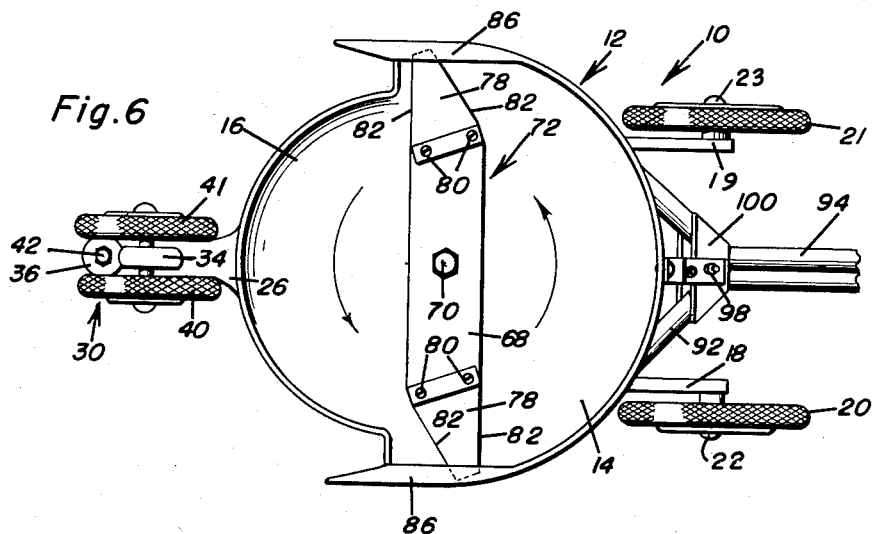
Figure 6 is a bottom plan view of the rotary grass cutter of Figure 1 and shows the general relationship of the rotary blade thereof with respect to the supporting frame so as to permit the cutting of grass adjacent the outer edges of the supporting frame, the rotary blade being shown rotated 90° from the position illustrated in Figure 3.
Figure 8:
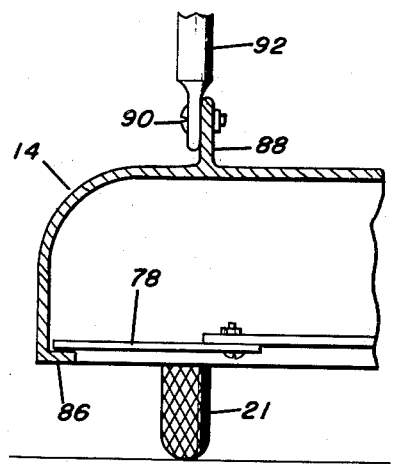
Figure 8 is an enlarged fragmentary vertical sectional view taken substantially upon the plane indicated by the section line 8—8 of Figure 2 and shows the relationship of the rotary cutter with respect to an inwardly projecting flange of the suppporting frame.

Referring now to Figures 6 and 8 in particular, it will be seen that the blade member 68 is in the form of an elongated rectangular strip. Secured to opposite ends of the blade member 68 are a pair of removable blade elements 78 which are generally triangular in outline. The blade elements 78 are removably secured to the underside of the blade member 68 by suitable fasteners 80. It will be noted that the blade elements 78 are provided with a pair of cutting edges 82 and are of the reversible type. It will also be noted that the blade elements 78 are so shaped whereby one of the cutting edges 82 thereof may be selectively aligned with a leading edge of the blade member 68 irrespective of the cutting edge 82 which is the effective cutting edge.

As is best illustrated in Figures 2 and 6, the main part of the body portion 14 extends outwardly of the forward part 16. It will also be seen that the main part of the body portion 14 is provided with forwardly extending projections 84 at the extreme side edges thereof, the forwardly extending projections being disposed in outwardly spaced relation with respect to adjacent portions of the forward part 16. It will also be noted that the body portion 14 is provided with an inwardly directed flange 86 at its lower edge which extends forwardly and in aligned relation to the forwardly extending projections 84. It will be seen that each of the flanges 86 directly underlies the blade elements 78 as they pass around in the rotation of the rotary blade 70. Due to the particular relationship of the forward part 16 and the forwardly extending projections 84, grass is urged inwardly for engagement with the cutting element 78 so that the effective cutting width of the rotary grass cutter 10 is substantially equal to the width of the supporting frame 12. Thus, it will be seen that the rotary grass cutter 10 may be utilized in cutting grass closely adjacent buildings, plants, etc. It will be seen that the particular arrangement of the wheels 20 and 40 permits such an operation.

Figure 7:
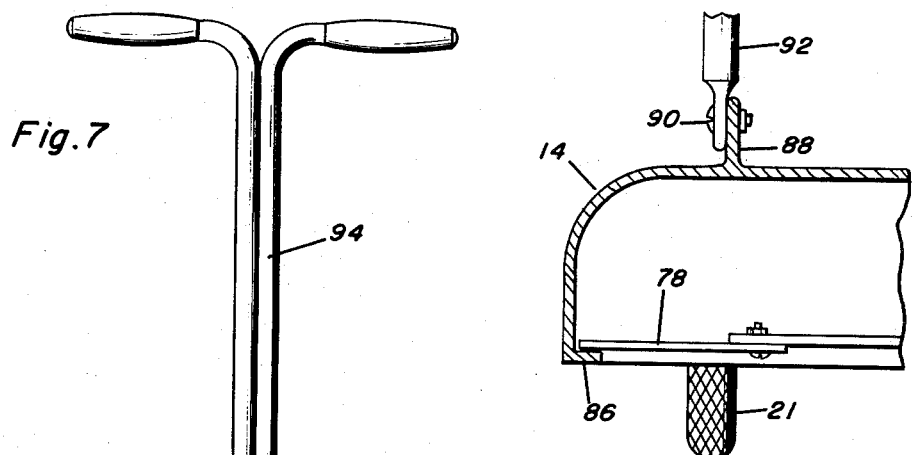
Figure 7 is a front elevational view of the rotary grass cutter of Figure 1.

As is best illustrated in Figures 2, 3 and 7, the top wall part 54 of the body portion 14 is provided with a pair of spaced parallel upstanding ears 88. The ears 88 have pivotally connected thereto by pivot pins 90 lower ends of a bifurcated portion 92 of a handle 94. In order that the handle 94 may be retained in an adjusted upwardly and rearwardly sloping position, there is carried by the handle 94 intermediate its ends a plate 96 which has secured thereto a downwardly projecting fastener 98. Carried by the fastener 98 is a lower plate 100 which is clamped against the underside of the handle 94. Also carried by the fastener 98 is an upper end of an upper brace half 102.

Carried by the extreme rear part of the body portion 14 is an upstanding lower brace half 104. The lower brace half 104 is rigidly secured to the body portion 14 by fasteners 106. The upper brace half 102 and the lower brace half 104 have overlapping portions which are secured together by a fastener 108. As is best illustrated in Figure 5, the brace halves 102 and 104 are provided in their overlapping portions with a plurality of vertically spaced apertures 110 through which the fastener 108 may be selectively positioned to vary the effective length of the two brace halves 102 and 104 to position the handle 94.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A rotary grass cutter comprising a generally circular wheeled supporting frame, said frame being concave and having a rotary blade mounted within the confines of the underside thereof, drive means for said blade carried by said frame and connected thereto, said frame having a semi-circular forward part and a semi-circular main part, said semi-circular forward part being of substantially less width than said main part, projections carried by said main part and extending forwardly thereof, said projections being outwardly spaced from said forward part, inwardly extending flanges on the bottom edges of said projections, said blade riding over said flanges.

2. A rotary grass cutter comprising a generally circular wheeled supporting frame, said frame being concave and having a rotary blade mounted within the confines of the underside thereof, drive means for said blade carried by said frame and connected thereto, said frame having a semi-circular forward part and a semi-circular main part, said semi-circular forward part being of substantially less width than said main part, projections carried by said main part and extending forwardly thereof, said projections being outwardly spaced from said forward part, inwardly extending flanges on the bottom edges of said projections, said blade riding over said flanges, the lowermost edge of said forward part being vertically offset and raised with respect to the lowermost edge of said main part and with respect to said projections and flanges whereby said projections and flanges guide grass into engagement with said blade.

References Cited in the file of this patent

UNITED STATES PATENTS

| | | |
|---|---|---|
| 1,992,494 | Lundin | Feb. 26, 1935 |
| 2,167,222 | Shelor | July 25, 1939 |
| 2,203,198 | Junge | June 4, 1940 |
| 2,208,972 | Goodall | July 23, 1940 |
| 2,504,416 | Hileman | Apr. 18, 1950 |
| 2,521,972 | Haglund et al. | Sept. 12, 1950 |
| 2,531,081 | Shippey | Nov. 21, 1950 |
| 2,539,619 | Goodall | Jan. 30, 1951 |
| 2,559,920 | Hainke | July 10, 1951 |
| 2,564,201 | Hainke | Aug. 14, 1951 |
| 2,645,300 | Watts et al. | July 14, 1953 |
| 2,660,847 | Britten, III | Dec. 1, 1953 |